UNITED STATES PATENT OFFICE.

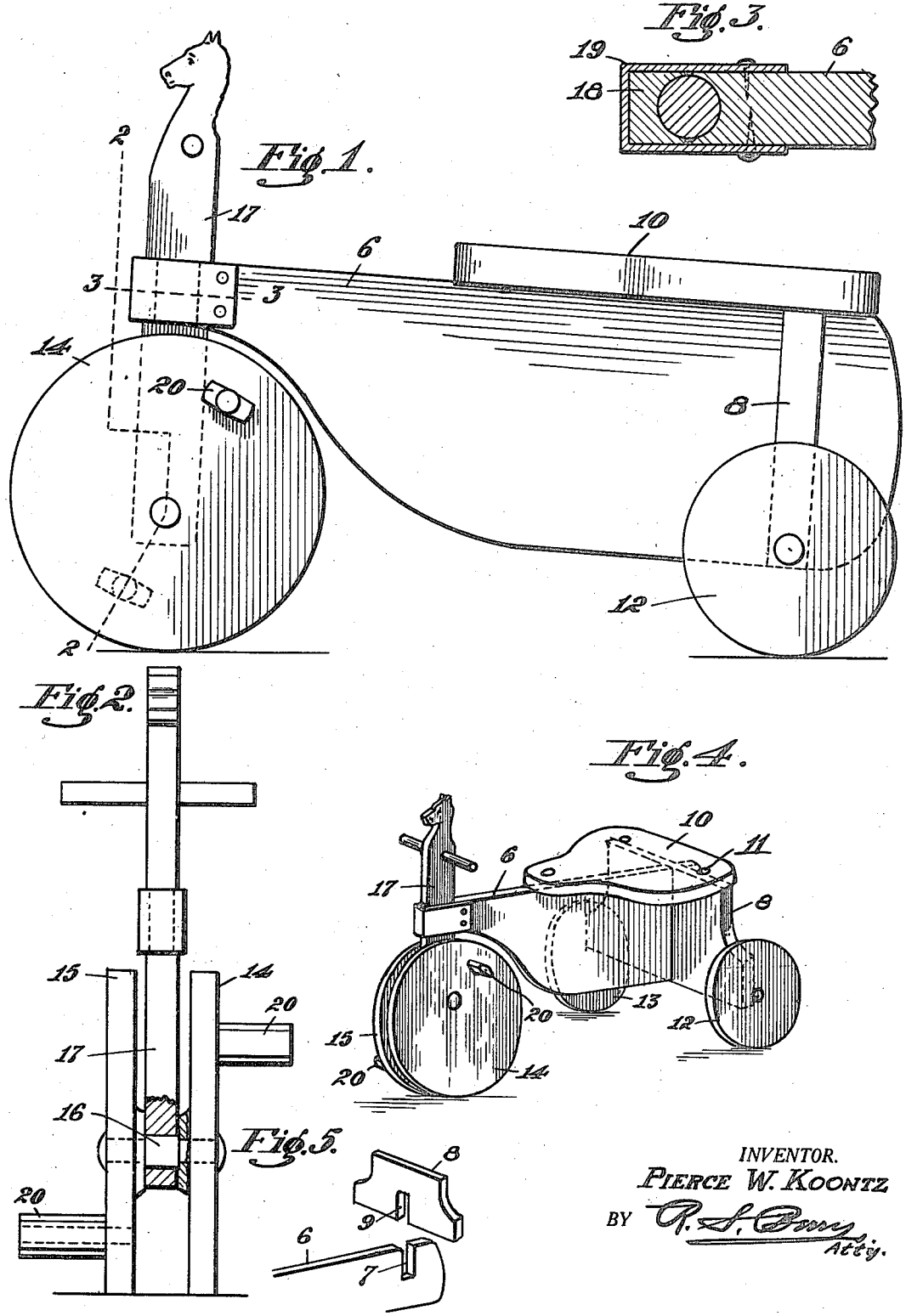

PIERCE W. KOONTZ, OF LOS ANGELES, CALIFORNIA.

CHILD'S VEHICLE.

1,306,916.　　　　　Specification of Letters Patent.　　Patented June 17, 1919.

Application filed August 29, 1917. Serial No. 188,757.

*To all whom it may concern:*

Be it known that I, PIERCE W. KOONTZ, a citizen of the United States, residing at Los Angeles, in the county of Los Angeles and State of California, have invented a new and useful Child's Vehicle, of which the following is a specification.

This invention relates to a child's vehicle of the velocipede type, and the primary object thereof is to provide a foot propelled vehicle which when traversing a surface will have a rocking or galloping movement. Another object is to provide an amusement vehicle of the above type which can be manufactured at small cost and which is so constructed that it may be quickly assembled and the parts so interconnected as to render the structure strong and substantial. Other objects will appear hereinafter.

The invention is illustrated in the accompanying drawings, in which;

Figure 1 is a view of the vehicle as seen in side elevation.

Fig. 2 is a detail vertical section as seen on the line 2—2 of Fig. 1.

Fig. 3 is a horizontal section as seen on the line 3—3 of Fig. 1.

Fig. 4 is a view of the vehicle in perspective.

Fig. 5 is a view illustrating the manner of interlocking the rear parts of the frame.

More specifically 6 indicates the main body of the vehicle which is formed of a vertically arranged board, one end of which is cut away on its under edge to afford clearance for the front wheel or wheels, and having a vertical open ended slot 7 in its upper edge near its rear end extending about half way through the width of the board.

A tail board 8, comprising a rear axle, is formed with an open ended slot 9 and is attached to the body board transversely thereof by inter-engaging the slots 7 and 9. The boards 6 and 8 extend at right angles to each other with their upper and lower edges flush. A seat board 10 of trifurcate shape is supported on the upper edges of the boards 6 and 8 and is secured thereto by screws 11 or other suitable fastenings, which serve in coöperation with the interlocking connection of the boards 6 and 8 to rigidly retain the board members together. Mounted on the ends of the tail board 8 is a pair of rear wheels 12 and 13 which support the rear portion of the vehicle.

An important feature of this invention resides in a means for imparting an undulating movement to the vehicle as it traverses a surface. This means is here shown as embodying a pair of wheels 14 and 15 which are eccentrically mounted on the ends of a stud-shaft 16 revolubly mounted in a bearing formed in the lower end of a steering column 17, the wheels being arranged close to the opposite sides of the column and spaced a short distance apart to form a narrow bearing surface and permit the wheels being turned laterally with ease as in steering, but being spaced sufficiently apart to afford a substantial support for the forward end of the vehicle.

The column is preferably rectangular in cross section a major portion of its length and is formed with a rounded part just above the upper edges of the wheels which extends into a vertical channel in the end edge of the board 6, the channel being semi-circular in section to conform to the rounded part of the column. A block 18 formed with an arcuate channel seats on the outer half of the rounded part of the column and is secured to the board 6 by a strap iron 19 of U-shape. A bearing is thus formed in which the column is turnable to direct the movement of the vehicle. The upper end of the column is fitted with a handle by which it may be turned.

Mounted on the wheels 14 and 15 are foot pedals 20 which are employed velocipede fashion in propelling the vehicle. As a means for facilitating the rotation of the eccentric wheels one of the pedals is positioned on its wheel rearward of the vertical center of the short side of the eccentric when the latter is uppermost, and the other pedal is arranged on the other wheel diametrically opposite the first pedal. By thus positioning the pedals a pedal will be disposed above the pivotal center of the wheel when the large portion of the eccentric is approaching the lowermost position so that a forward push on the pedal will carry the large part of the eccentric beyond the vertical center after which the wheel will tend to rotate at accelerated speed by action of the weight on the vehicle. This quickened movement may be retarded by bearing down on the other pedal which is arranged to move upward as the large side of the eccentric moves upward.

From the foregoing it will be seen that as the eccentrically mounted wheels revolve in advancing the vehicle an undulating movement will be imparted to the vehicle thus affording amusement and entertainment to the rider.

While I have shown and described a specific embodiment of my invention it is evident that sundry changes in details of construction may be made without departing from the spirit and scope of the appended claim. For example, if it is so desired, the undulating movement may be effected by mounting the rear wheels eccentrically.

I claim;

In a child's vehicle, a carriage, a pair of rear wheels thereon, a revoluble steering column on the forward end of the carriage, an eccentrically mounted wheel on said steering column for imparting an undulating motion to the carriage as the vehicle traverses a surface, and pedals mounted on said eccentric wheel arranged so that a pedal will pass over and forward of the pivotal center of the wheel as the large portion of the eccentric passes beneath and rearward of the pivotal center.

PIERCE W. KOONTZ.